(12) United States Patent
Pettit et al.

(10) Patent No.: US 10,158,538 B2
(45) Date of Patent: *Dec. 18, 2018

(54) REPORTING ELEPHANT FLOWS TO A NETWORK CONTROLLER

(71) Applicant: Nicira, Inc., Palo Alto, CA (US)

(72) Inventors: Justin Pettit, Los Altos Hills, CA (US); Martin Casado, Portola Valley, CA (US); Teemu Koponen, San Francisco, CA (US); Bruce Davie, Menlo Park, CA (US); W. Andrew Lambeth, San Mateo, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/231,654

(22) Filed: Mar. 31, 2014

(65) Prior Publication Data

US 2015/0163145 A1    Jun. 11, 2015

Related U.S. Application Data

(60) Provisional application No. 61/913,899, filed on Dec. 9, 2013.

(51) Int. Cl.
*H04L 12/801* (2013.01)
*H04L 12/26* (2006.01)
(Continued)

(52) U.S. Cl.
CPC .......... *H04L 43/026* (2013.01); *H04L 43/16* (2013.01); *H04L 47/11* (2013.01); *H04L 47/125* (2013.01);
(Continued)

(58) Field of Classification Search
None
See application file for complete search history.

(56) References Cited

U.S. PATENT DOCUMENTS

| 5,224,100 A | 6/1993 | Lee et al. |
| 5,245,609 A | 9/1993 | Ofek et al. |

(Continued)

FOREIGN PATENT DOCUMENTS

| EP | 1154601 | 11/2001 |
| JP | 2002-141905 | 5/2002 |

(Continued)

OTHER PUBLICATIONS

Anwer, Muhammad Bilal, et al., "Building a Fast, Virtulized Data Plane with Programmable Hardware," Aug. 17, 2009, pp. 1-8, VISA'09, ACM Barcelona, Spain.

(Continued)

*Primary Examiner* — Bunjob Jaroenchonwanit
(74) *Attorney, Agent, or Firm* — Adeli LLP

(57) ABSTRACT

Some embodiments provide a system that detects whether a flow is an elephant flow; and if so, the system treats it differently than a mouse flow. The system of some embodiment detect elephants based on one or more of the following: statistics associated with a flow, packet segment size, and invoked system calls. Also, some embodiments use one or more various methods to handle elephant flows. Examples of such methods include marking each packet belonging to an elephant with a particular marking, breaking the elephants into mice, reporting the elephant to a network controller, and selectively choosing a route for each packet belonging to the elephant.

16 Claims, 12 Drawing Sheets

(51) Int. Cl.
*H04L 12/803* (2013.01)
*H04L 12/947* (2013.01)
*H04L 12/935* (2013.01)

(52) U.S. Cl.
CPC ........ *H04L 49/252* (2013.01); *H04L 49/3009* (2013.01); *H04L 49/3018* (2013.01)

(56) References Cited

U.S. PATENT DOCUMENTS

| | | | |
|---|---|---|---|
| 5,265,092 A | 11/1993 | Soloway et al. | |
| 5,504,921 A | 4/1996 | Dev et al. | |
| 5,550,816 A | 8/1996 | Hardwick et al. | |
| 5,668,810 A * | 9/1997 | Cannella, Jr. | H04L 12/56 348/E7.056 |
| 5,729,685 A | 3/1998 | Chatwani et al. | |
| 5,751,967 A | 5/1998 | Raab et al. | |
| 5,781,534 A | 7/1998 | Perlman et al. | |
| 6,104,699 A | 8/2000 | Holender et al. | |
| 6,104,700 A | 8/2000 | Haddock et al. | |
| 6,141,738 A | 10/2000 | Munter et al. | |
| 6,219,699 B1 | 4/2001 | McCloghrie et al. | |
| 6,430,160 B1 | 8/2002 | Smith et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,658,002 B1 | 12/2003 | Ross et al. | |
| 6,680,934 B1 | 1/2004 | Cain | |
| 6,721,334 B1 | 4/2004 | Ketcham | |
| 6,785,843 B1 | 8/2004 | McRae et al. | |
| 6,941,487 B1 | 9/2005 | Balakrishnan et al. | |
| 6,963,585 B1 | 11/2005 | Le Pennec et al. | |
| 6,999,454 B1 | 2/2006 | Crump | |
| 7,012,919 B1 * | 3/2006 | So | H04L 41/5019 370/235 |
| 7,079,544 B2 | 7/2006 | Wakayama et al. | |
| 7,149,817 B2 * | 12/2006 | Pettey | H04L 29/06 709/200 |
| 7,149,819 B2 * | 12/2006 | Pettey | H04L 29/06 709/200 |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,283,473 B2 | 10/2007 | Arndt et al. | |
| 7,342,916 B2 | 3/2008 | Das et al. | |
| 7,362,752 B1 * | 4/2008 | Kastenholz | H04L 41/12 370/389 |
| 7,370,120 B2 * | 5/2008 | Kirsch | H04L 29/06 380/269 |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,370 B1 | 1/2009 | Dayal et al. | |
| 7,533,176 B2 * | 5/2009 | Freimuth | H04L 49/90 370/235 |
| 7,555,002 B2 | 6/2009 | Arndt et al. | |
| 7,606,260 B2 | 10/2009 | Oguchi et al. | |
| 7,627,692 B2 | 12/2009 | Pessi | |
| 7,633,955 B1 | 12/2009 | Saraiya et al. | |
| 7,634,622 B1 * | 12/2009 | Musoll | G06F 9/3851 370/375 |
| 7,640,353 B2 * | 12/2009 | Shen | H04L 12/00 709/230 |
| 7,643,488 B2 | 1/2010 | Khanna et al. | |
| 7,649,851 B2 | 1/2010 | Takashige et al. | |
| 7,706,266 B2 | 4/2010 | Plamondon | |
| 7,710,874 B2 | 5/2010 | Balakrishnan et al. | |
| 7,760,735 B1 | 7/2010 | Chen et al. | |
| 7,764,599 B2 | 7/2010 | Doi et al. | |
| 7,792,987 B1 | 9/2010 | Vohra et al. | |
| 7,802,000 B1 | 9/2010 | Huang et al. | |
| 7,808,919 B2 | 10/2010 | Nadeau et al. | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,937,492 B1 | 5/2011 | Kompella et al. | |
| 7,940,763 B1 * | 5/2011 | Kastenholz | H04L 12/2856 370/255 |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,606 B2 | 10/2011 | Memon et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,161,270 B1 | 4/2012 | Parker et al. | |
| 8,166,201 B2 | 4/2012 | Richardson et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,558 B2 | 1/2013 | Nicholson et al. | |
| 8,351,418 B2 | 1/2013 | Zhao et al. | |
| 8,355,328 B2 | 1/2013 | Matthews et al. | |
| 8,456,984 B2 | 6/2013 | Ranganathan et al. | |
| 8,504,718 B2 | 8/2013 | Wang et al. | |
| 8,571,031 B2 | 10/2013 | Davies et al. | |
| 8,611,351 B2 | 12/2013 | Gooch et al. | |
| 8,612,627 B1 | 12/2013 | Brandwine | |
| 8,619,731 B2 * | 12/2013 | Montemurro | H04L 47/10 370/338 |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,644,188 B1 | 2/2014 | Brandwine et al. | |
| 8,762,501 B2 | 6/2014 | Kempf et al. | |
| 8,819,259 B2 * | 8/2014 | Zuckerman | H04L 67/1097 709/231 |
| 8,838,743 B2 | 9/2014 | Lewites et al. | |
| 8,976,814 B2 * | 3/2015 | Dipasquale | H04L 12/6418 370/474 |
| 9,762,507 B1 * | 9/2017 | Gandham | H04L 47/806 |
| 2001/0043614 A1 | 11/2001 | Viswanadham et al. | |
| 2002/0062422 A1 * | 5/2002 | Butterworth | G06F 11/0727 711/114 |
| 2002/0093952 A1 | 7/2002 | Gonda | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0063556 A1 * | 4/2003 | Hernandez | H04L 27/2614 370/208 |
| 2003/0093341 A1 * | 5/2003 | Millard | G06Q 30/04 705/34 |
| 2003/0191841 A1 * | 10/2003 | DeFerranti | H04L 12/14 709/226 |
| 2004/0073659 A1 | 4/2004 | Rajsic et al. | |
| 2004/0098505 A1 | 5/2004 | Clemmensen | |
| 2004/0186914 A1 | 9/2004 | Shimada | |
| 2004/0264472 A1 * | 12/2004 | Oliver | H04L 12/5693 370/395.4 |
| 2004/0267866 A1 | 12/2004 | Carollo et al. | |
| 2004/0267897 A1 | 12/2004 | Hill et al. | |

(56) References Cited

U.S. PATENT DOCUMENTS

| | | |
|---|---|---|
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0182853 A1 | 8/2005 | Lewites et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0104286 A1* | 5/2006 | Cheriton ............ G06F 17/30949 370/395.32 |
| 2006/0140118 A1* | 6/2006 | Alicherry ............ H04J 3/1617 370/235 |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0221961 A1 | 10/2006 | Basso et al. |
| 2006/0246900 A1* | 11/2006 | Zheng ................ H04L 12/5695 455/435.3 |
| 2006/0262778 A1* | 11/2006 | Haumont ............ H04L 63/164 370/356 |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0258382 A1* | 11/2007 | Foll ..................... H04L 12/2602 370/252 |
| 2007/0260721 A1 | 11/2007 | Bose et al. |
| 2007/0283412 A1* | 12/2007 | Lie ..................... H04W 12/08 726/1 |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049614 A1 | 2/2008 | Briscoe et al. |
| 2008/0049621 A1 | 2/2008 | McGuire et al. |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0240095 A1 | 10/2008 | Basturk |
| 2009/0006607 A1* | 1/2009 | Bu ...................... H04L 43/028 709/224 |
| 2009/0010254 A1 | 1/2009 | Shimada |
| 2009/0046581 A1* | 2/2009 | Eswaran ............. H04L 43/0876 370/230 |
| 2009/0150527 A1 | 6/2009 | Tripathi et al. |
| 2009/0292858 A1 | 11/2009 | Lambeth et al. |
| 2010/0128623 A1 | 5/2010 | Dunn et al. |
| 2010/0131636 A1 | 5/2010 | Suri et al. |
| 2010/0157942 A1* | 6/2010 | An ..................... H04W 36/0077 370/331 |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0257263 A1* | 10/2010 | Casado ............... H04L 49/00 709/223 |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085461 A1* | 4/2011 | Liu ..................... H04L 43/12 370/252 |
| 2011/0085557 A1 | 4/2011 | Gnanasekaram et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0164503 A1* | 7/2011 | Yong .................. H04L 69/22 370/237 |
| 2011/0194567 A1 | 8/2011 | Shen |
| 2011/0202920 A1 | 8/2011 | Takase |
| 2011/0249970 A1* | 10/2011 | Eddleston ............ H04L 12/18 398/58 |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0054367 A1* | 3/2012 | Ramakrishnan ...... G06F 9/4856 709/242 |
| 2012/0079478 A1 | 3/2012 | Galles et al. |
| 2012/0131222 A1* | 5/2012 | Curtis ................. H04L 47/2441 709/235 |
| 2012/0159454 A1 | 6/2012 | Barham et al. |
| 2012/0182992 A1 | 7/2012 | Cowart et al. |
| 2012/0243539 A1* | 9/2012 | Keesara ............. H04L 45/66 370/392 |
| 2012/0287791 A1* | 11/2012 | Xi ..................... H04L 43/0882 370/237 |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0064088 A1 | 3/2013 | Yu et al. |
| 2013/0067067 A1 | 3/2013 | Miri et al. |
| 2013/0163427 A1 | 6/2013 | Beliveau et al. |
| 2013/0163475 A1 | 6/2013 | Beliveau et al. |
| 2013/0286846 A1* | 10/2013 | Atlas .................. H04L 45/34 370/236 |
| 2013/0287026 A1* | 10/2013 | Davie ................. H04L 49/70 370/392 |
| 2013/0322248 A1* | 12/2013 | Guo ................... H04L 45/507 370/235 |
| 2013/0332602 A1 | 12/2013 | Nakil et al. |
| 2013/0339544 A1 | 12/2013 | Mithyantha |
| 2014/0019639 A1 | 1/2014 | Ueno |
| 2014/0029451 A1 | 1/2014 | Nguyen |
| 2014/0108738 A1* | 4/2014 | Kim ................... G06F 12/0891 711/136 |
| 2014/0115578 A1 | 4/2014 | Cooper et al. |
| 2014/0119203 A1 | 5/2014 | Sundaram et al. |
| 2014/0173018 A1* | 6/2014 | Westphal ............ H04L 41/0823 709/213 |
| 2014/0195666 A1 | 7/2014 | Dumitriu et al. |
| 2014/0233421 A1* | 8/2014 | Matthews ........... H04L 43/0888 370/253 |
| 2014/0281030 A1 | 9/2014 | Cui et al. |
| 2014/0372616 A1* | 12/2014 | Arisoylu ............. H04L 67/1029 709/226 |
| 2015/0016255 A1* | 1/2015 | Bisht .................. H04L 47/11 370/235 |
| 2015/0071072 A1* | 3/2015 | Ratzin ................ H04L 47/11 370/235 |
| 2015/0106804 A1* | 4/2015 | Chandrashekhar ..... H04L 45/64 718/1 |
| 2015/0120959 A1* | 4/2015 | Bennett .............. H04L 47/10 709/233 |
| 2015/0124825 A1* | 5/2015 | Dharmapurikar ... H04L 45/7453 370/392 |
| 2015/0163117 A1 | 6/2015 | Lambeth et al. |
| 2015/0163142 A1 | 6/2015 | Pettit et al. |
| 2015/0163144 A1 | 6/2015 | Koponen et al. |
| 2015/0163146 A1* | 6/2015 | Zhang ................ H04L 47/125 370/238 |

(56) References Cited

U.S. PATENT DOCUMENTS

| | | | |
|---|---|---|---|
| 2015/0172075 A1* | 6/2015 | DeCusatis | H04L 12/4633 370/235 |
| 2015/0180769 A1* | 6/2015 | Wang | H04L 45/586 370/236 |
| 2015/0237097 A1 | 8/2015 | Devireddy et al. | |

FOREIGN PATENT DOCUMENTS

| | | |
|---|---|---|
| JP | 2003-069609 | 3/2003 |
| JP | 2003-124976 | 4/2003 |
| JP | 2003-318949 | 11/2003 |
| WO | WO 95/06989 | 3/1995 |
| WO | WO 2004/047377 | 6/2004 |
| WO | WO 2012/126488 | 9/2012 |
| WO | WO 2013/184846 | 12/2013 |

OTHER PUBLICATIONS

Author Unknown, "Open vSwitch, an OpenVault Switch," Dec. 30, 2010, 2 pages.

Author Unknown, "OpenFlow Switch Specification, Version 0.9.0 (Wire Protocol 0x98)," Jul. 20, 2009, pp. 1-36, Open Networking Foundation.

Author Unknown, "OpenFlow Switch Specification, Version 1.0.0 (Wire Protocol 0x01)," Dec. 31, 2009, pp. 1-42, Open Networking Foundation.

Author Unknown, "OpenFlow Switch Specification, Version 1.1.0 Implemented (Wire Protoco 0x02)," Feb. 28, 2011, pp. 1-56, Open Networking Foundation.

Casado, Martin, et al. "Ethane: Taking Control of the Enterprise," SIGCOMM'07, Aug. 27-31, 2007, pp. 1-12, ACM, Kyoto, Japan.

Curtis, Andrew R., et al., "DevoFlow: Scaling Flow Management for High-Performance Networks," Aug. 15, 2011, pp. 254-265, SIGCOMM, ACM.

Das, Saurav, et al. "Simple Unified Control for Packet and Circuit Networks," Month Unknown, 2009, pp. 147-148, IEEE.

Das, Saurav, et al., "Unifying Packet and Circuit Switched Networks with OpenFlow," Dec. 7, 2009, 10 pages.

Fernandes, Natalia C., et al., "Virtual networks:isolation, performance, and trends," Oct. 7, 2010, 17 pages, Institut Telecom and Springer-Verlag.

Foster, Nate, et al., "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX: Towards an Operating System for Networks," Jul. 2008, pp. 105-110, vol. 38, No. 3, ACM SIGCOMM Computer communication Review.

Hinrichs, Timothy L., et al., "Practical Declarative Network Management," WREN'09, Aug. 21, 2009, pp. 1-10, Barcelona, Spain.

Koponen, Teemu, et al., "Network Virtualization in Multi-tenant Datacenters," Aug. 2013, pp. 1-22, VMware, Inc., Palo Alto, California, USA.

Koponen, Teemu, et al., "Onix: A Distributed Control Platform for Large-scale Production Networks," In Proc. OSDI, Oct. 2010, pp. 1-14.

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo, Boon Thau, et al., "Implementing Declarative Overlays," In Proc. of SOSP, Oct. 2005, 16 pages. Brighton, United Kingdom.

Matsumoto, Nobutaka, et al., "LightFlow: Speeding Up GPU-based Flow Switching and Facilitating Maintenance of Flow Table," 2012 IEEE 13$^{th}$ International Conference on High Performance Switching and Routing, Jun. 24, 2012, pp. 76-81, IEEE.

McKeown, Nick, et al., "OpenFlow: Enabling Innovation in Campus Networks," ACS SIGCOMM Computer communication Review, Apr. 2008, pp. 69-74, vol. 38, No. 2.

Nygren, Anders, et al., OpenFlow Switch Specification, Version 1.3.4 (Protocol version 0x04), Mar. 27, 2014, pp. 1-84, Open Networking Foundation. (Part 1 of 2).

Nygren, Anders, et al., OpenFlow Switch Specification, Version 1.3.4 (Protocol version 0x04), Mar. 27, 2014, pp. 85-171, Open Networking Foundation. (Part 2 of 2).

Pettit, Justin, et al., "Virtual Switching in an Era of Advanced Edges," Sep. 2010, 7 pages.

Pfaff, B., et al., "The Open vSwitch Database Management Protocol," draft-pfaff-ovsdb-proto-00, Aug. 20, 2012, pp. 1-34, Nicira, Inc., Palo Alto, California, USA.

Pfaff, Ben, et al., "OpenFlow Switch Specification," Sep. 6, 2012, 128 pages, The Open Networking Foundation.

Pfaff, Ben., et al., "Extending Networking into the Virtualization Layer," Proc. of HotNets, Oct. 2009, pp. 1-6.

Phaal, Peter, et al., "sFlow Version 5," Jul. 2004, 46 pages, sFlow. org.

Phan, Doantam, et al., "Visual Analysis of Network Flow Data with Timelines and Event Plots," month unknown, 2007, pp. 1-16, VizSEC.

Popa, Lucian, et al., "Building Extensible Networks with Rule-Based Forwarding," In USENIX OSDI, Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Tavakoli, Arsalan, et al., "Applying NOX to the Datacenter," month unknown, 2009, 6 pages, Proceedings of HotNets.

Yu, Minlan, et al., "Scalable Flow-Based Networking with DIFANE," Aug. 2010, pp. 1-16, In Proceedings of SIGCOMM.

\* cited by examiner

REPORTING ELEPHANT FLOWS TO A NETWORK CONTROLLER

CLAIM OF BENEFIT TO PRIOR APPLICATIONS

This application claims the benefit of U.S. Provisional Patent Application 61/913,899, entitled "Detecting and Handling Elephant Flows", filed on Dec. 9, 2013.

BACKGROUND

Today, a datacenter may process different types of flows, including elephant flows and mouse flows. An elephant flow represents a long-lived flow or a continuous traffic flow that is typically associated with high volume connection. Different from an elephant flow, a mouse flow represents a short-lived flow. Mice are often associated with bursty, latency-sensitive applications, whereas elephants tend to be associated with large data transfers in which throughput is far more important than latency.

A problem with elephant flows is that they tend to fill network buffers end-to-end, and this introduces non-trivial queuing delay to anything that shares these buffers. For instance, a forwarding element may be responsible for managing several queues to forward packets, and several packets belonging to a mouse flow may be stuck in the same queue behind a group of other packets belonging to an elephant flow. In a network of elephants and mice, this means that the more latency-sensitive mice are being affected. Another problem is that mice are generally very bursty, so adaptive routing techniques are not effective with them.

BRIEF SUMMARY

Embodiments described herein provide a forwarding element that monitors network traffic to detect an elephant flow and reports the elephant flow to a network controller if it detects one. In some embodiments, the network controller is a software-defined networking (SDN) controller, which receives the report and configures, based on the report, one or more forwarding elements to handle the elephant flow. The network controller can configure the same forwarding element, and/or can configure one or more other forwarding elements that receive packets in the same elephant data flow.

In some embodiments, the forwarding element that performs the monitoring and reporting is an edge forwarding element. The edge forwarding element represents a last forwarding element before one or more end machines. In some such embodiments, the edge forwarding element reports a detected elephant flow to a network controller, which in turn configures a non-edge forwarding element to handle the elephant flow. Alternatively, when a report is received from the edge forwarding element, the network controller may configure another edge forwarding element. In some embodiments, the forwarding element that performs the monitoring and reporting is a non-edge forwarding element. When the non-edge forwarding element reports an elephant flow, the network controller may configure another non-edge forwarding element or an edge forwarding element, in some embodiments.

In some embodiments, the forwarding element, which performs the monitoring and reporting, is configured and managed by a first network controller (e.g., in a controller cluster) but reports to a second different network controller that configures and manages one or more other forwarding elements. For instance, the first network controller may manage a number of Layer 2 switches, while the second different network controller manages a number of Layer 3 switches. In some embodiments, the first network controller manages a number of software forwarding elements (e.g., software switches), while the second different network controller manages a number of hardware forwarding elements (e.g., Top-of-Rack (TOR) switches).

The forwarding element of some embodiments monitors tunneled traffic to detect elephant flows. In some embodiments, the forwarding element is an edge forwarding element that operate in conjunction with another forwarding element to monitor and report any elephant flows, detected at either ends of the tunnel, to the network controller. As an example, in detecting elephant flows, a first forwarding element at one end of the tunnel may monitor outbound packets from a first network host to a second network host, and a second forwarding element at the other end of the tunnel may monitor outbound packets from the second network host to the first network host. When an elephant flow is detected at one end of the tunnel, the corresponding forwarding element then reports the flow to the network controller.

As mentioned above, when an elephant flow is detected, the forwarding element of some embodiments identifies one or more pieces of information that can be used to identify packets belonging to an elephant flow. The forwarding element may identify tunnel information, such as the tunnel ID, the IP address of the source tunnel endpoint (e.g., the hypervisor), and the IP address of the destination tunnel endpoint. The forwarding element of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

In some embodiments, the network controller is registered with the forwarding element to receive an update report each time the forwarding element detects an elephant. For instance, when an elephant flow is detected, the forwarding element may store one or more pieces of information relating to the elephant flow in a storage (e.g., a database) through a database server. The network controller may be registered with the forwarding element (e.g., the forwarding element's database server) to receive an update if there are any changes to the data relating to elephant flows in the storage. Hence, if there is an update, the forwarding element's database server may send a notification (e.g., an asynchronous notification) to the network controller regarding the change to the elephant flow data stored in the database. The notification may include one or more pieces of information mentioned above.

When a report regarding an elephant flow is received, the network controller of some embodiments configures one or more forwarding elements. Different embodiments configure the network controller differently. As an example, the network controller perform a Quality of Service (QOS) configuration on the forwarding element to place packets belonging to the elephant flow in a particular queue that is separate from one or more other queues with other packets, break the elephant flow into mice flows, etc. Alternatively, the network controller may configure the forwarding element to break the elephant flow into mice flows by sending packets associated with the elephant flow along different paths (e.g., equal-cost multipath routing (ECMP) legs). As another example, the forwarding element may be configured to send elephant flow traffic along a separate physical network, such as an optical network that is more suitable for slow changing, bandwidth-intensive traffic.

Additional techniques for detecting and handling elephant flows are described in U.S. patent application Ser. No. 14/231,647, entitled "Detecting and Handling Elephant Flows", filed concurrently with this application, and now published as U.S. Patent Publication No. 2015/0163144. Furthermore, several embodiments that detect an elephant flows based on the size of a packet are described in U.S. patent application Ser. No. 14/231,652, entitled "Detecting an Elephant Flow Based on the Size of a Packet", filed concurrently with this application, and now issued as U.S. Pat. No. 9,548,924. These U.S Patent Applications are incorporated herein by reference. In addition, some embodiments provide a system that detects an elephant flow by examining the operations of a machine. In some embodiments, the machine is a physical machine or a virtual machine (VM). In detecting, the system identifies an initiation of a new data flow associated with the machine. The new data flow can be an outbound data flow or an inbound data flow. The system then determines, based on the amount of data being sent or received, if the data flow is an elephant flow.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a forwarding element that monitors network traffic to detect an elephant flow and reports the elephant flow to a network controller if it detects one. In some embodiments, the network controller is a software-defined networking (SDN) controller, which receives the report and configures, based on the report, one or more forwarding elements to handle the elephant flow. The network controller can configure the same forwarding element, and/or can configure one or more other forwarding elements that receive packets in the same elephant data flow.

Figure 1:
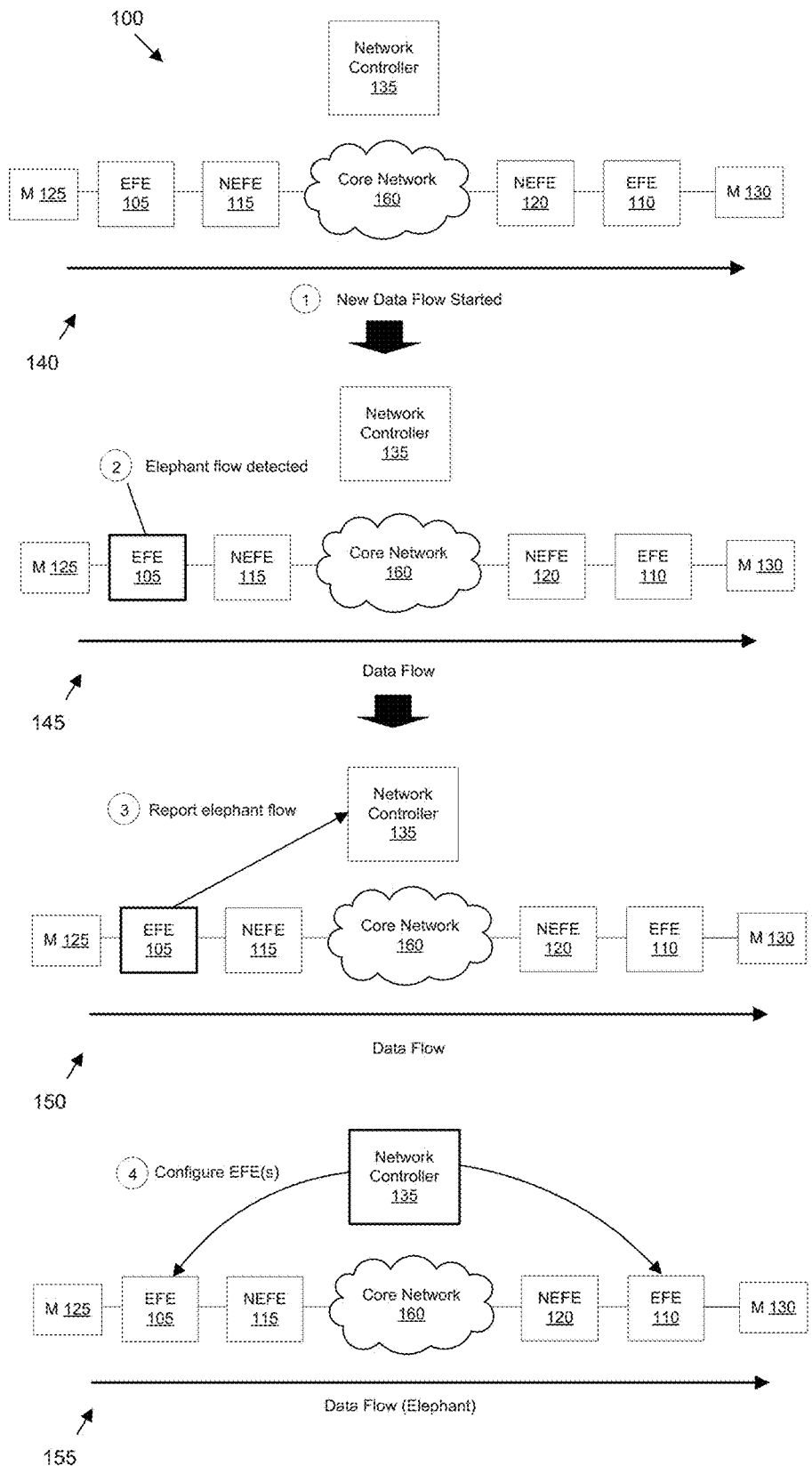
FIG. 1 illustrates an example of a forwarding element that reports an elephant flow to a network controller.

For some embodiments of the invention, FIG. 1 conceptually illustrates an example of a forwarding element 105 that (1) monitors network traffic to detect an elephant flow and (2) reports the elephant flow to a network controller 135 if it detects one. The figure shows a network 100, which includes the forwarding element 105, the network controller 135, and several other forwarding elements 110-120. Four stages 140-155 of the network 100 are shown in the figure. Each of these stages will be described in detail below after an introduction of the elements of the network.

In the example of FIG. 1, each of the forwarding elements 105-120 can be a hardware forwarding element or a software forwarding element. The hardware forwarding element can have application-specific integrated circuits (ASICs) that are specifically designed to support in-hardware forwarding. Different from a hardware forwarding element, the software forwarding element operates on a host machine (e.g., an x86 box). The forwarding elements 105-120 process packets in the network. For example, each forwarding element can forward packets for different machines (e.g., the machines 125 and 130), drop packets, etc.

The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

The forwarding elements (105 and 110) represent edge forwarding elements (EFEs), while the remaining forwarding elements (115 and 120) are non-edge forwarding elements (NEFE). The forwarding elements (105 and 110) are EFEs because they are located at or near the edge of the network 100. In some embodiments, an EFE is the last forwarding element before one or more end machines (e.g., virtual machines (VMs), computing devices).

In some embodiments, the forwarding element 105 is configured to detect elephant flows and report each detected elephant flow to the network controller 135. The forwarding element may use one of several different methods to detect elephant flows. As an example, the forwarding element 105 might track statistics (e.g., packet count, byte count, bytes per second) associated with different data flows (e.g., flow entries). Alternatively, the forwarding element 105 may examine the sizes of different packets to detect elephant flows. The forwarding element 105 inspects the size because, in order for the packet to be of a certain size, the data flow had to already have gone through a slow start (e.g., TCP slow start) in which smaller packets are transferred and by definition be an elephant flow.

In detecting elephant flows, the forwarding element 105 of some embodiments monitors tunneled traffic from one network host (e.g., the machine 125) to another network host (e.g., the machine 130). For example, the forwarding element 105 may operate in conjunction with another forwarding element, such as the forwarding element 110, to monitor and report any elephant flows detected at either ends of the tunnel to the network controller.

The network controller 135 manages and configures one or more forwarding element. In the example of FIG. 1, the network controller 135 manages and configures two EFEs (105 and 110). The NEFEs (115 and 120) may be managed and configured by another network controller. Also, although the figure only shows one network controller, there can be a cluster of network controllers that (e.g., collectively) configures and manages the two EFEs (105 and 110), as well as other forwarding elements.

In some embodiments, the network controller 135 provides a network administrator with a unified control point in a network to simplify management, provisioning, and configuring several forwarding elements. The network controller of some embodiments allows the network administrator to perform a number of different tasks, such as defining tunnels, virtual networks, etc. The network controller cluster may push flows to the forwarding elements or push instructions that are translated to flows at the forwarding elements. The implementation of the network controller can change depending on one or more different types of forwarding elements that it supports, such as software fording element, hardware forwarding element, Layer 2 forwarding element, Layer 3 forwarding element, etc.

In some embodiments, the network controller 135 receives a report regarding a detected elephant flow and configures one or more forwarding elements. The network controller 135 can configure the same forwarding element, and/or can configure one or more other forwarding elements that receive packets in the same elephant data flow. In the examples of FIG. 1, the network controller configures the two EFEs (105 and 110). However, the network controller may configure one or more of the two NEFEs (115 and 120).

Different embodiments of the network controller configure a forwarding element differently. As an example, the network controller 135 may perform a Quality of Service (QOS) configuration on the forwarding element to place packets belonging to the elephant flow in a particular queue that is separate from one or more other queues with other packets. Alternatively, the network controller may configure the forwarding element to break the elephant flow into mice flows by sending packets associated with the elephant flow along different paths (e.g., equal-cost multipath routing (ECMP) legs). As another example, the forwarding element may be configured to send elephant flow traffic along a separate physical network, such as an optical network that is more suitable for slow changing, bandwidth-intensive traffic.

Having described several elements, the operations of the network in detecting an reporting the elephant flow, and configuring one or more forwarding elements to handle the elephant flow will now be described by reference to the three stages 140-155 that are illustrated in FIG. 1.

The first stage 145 shows the start of a new data flow in the network 100. The data flow originates at the machine 125, and terminates at the machine 130. The data flows through the network 100 including, the forwarding elements 105-120. The data also flows through a core network 160. Here, the core network 160 represents the physical core of the network 100. In the physical core, there can be a number of high capacity forwarding element that forward packets. Also, the data may flow through a wide area network (WAN) or the Internet.

The second stage 140 shows the EFE 105 detecting an elephant flow. Specifically, the EFE 105 has monitored the flow of data from the machine 125 to the machine 130, and determined that the data flow is an elephant flow. As mentioned above, the EFE105 of some embodiments detects an elephant flow by tracking statistics (e.g., packet count, byte count, bytes per second) associated with the data flow. Alternatively, the EFE 105 might have examined the sizes of different packets associated with the data flow in order to detect the elephant flow.

In the second stage 145, the EFE 105 has detected an elephant flow. The third stage 150 shows that, in response to the detection, the EFE 105 reports the elephant flow to the network controller 135. Here, in the fourth stage 155, the network controller 135 responds to the report regarding the elephant flow from the EFE 105. Specifically, the network controller 135 configures the two EFEs (105 and 110) to handle the elephant flow. As mentioned above, the network controller 425 may configure a forwarding element to place elephant flows into different queues from mice, choose different equal-cost multi-path routing (ECMP) paths for the elephant flows, route elephant flows along a separate physical network, etc.

Figure 2:
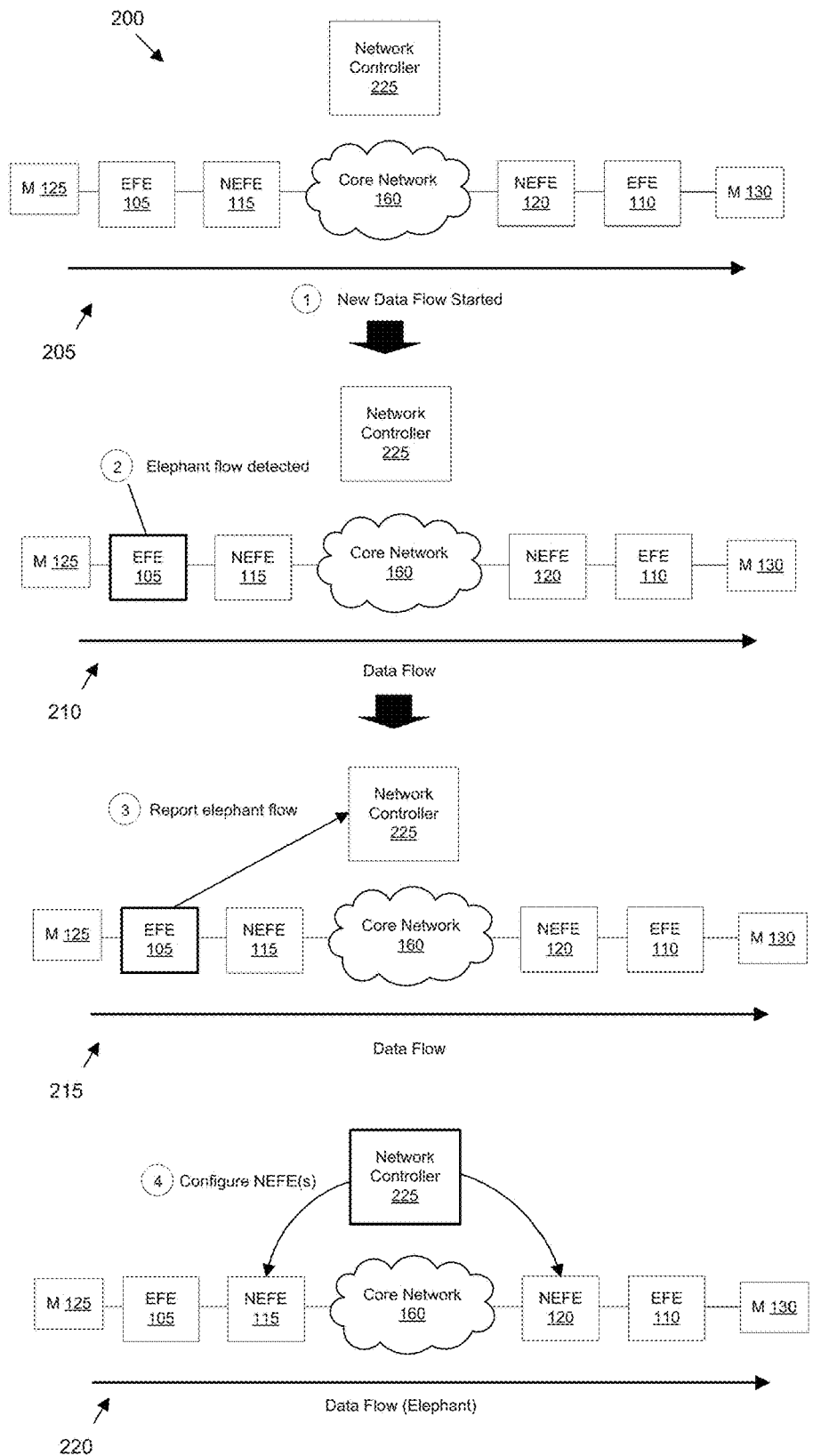
FIG. 2 illustrates an example of an edge forwarding element that reports an elephant flow to a network controller, which in turn configures one or more non-edge forwarding elements.

In the example described above, the network controller 135 configures one or more EFEs (105 and 110) to handle the elephant flow. FIG. 2 illustrates an example of another network controller 225 that configures two NEFEs (115 and 120) when it receives a report from the EFE 105. In some embodiments, the EFE 105 is configured and managed by the network controller 135 (e.g., shown in the previous figure) but reports to the second different network controller 225 that configures and manages one or more non-edge forwarding elements. For instance, the first network controller 135 may manage a number of software forwarding elements, while the second network controller 255 may manage a number of hardware forwarding elements.

Four stages 205-220 of a network 200 are shown in FIG. 2. The first three stages 205-215 are identical to the previous figure. Specially, in the first stage 205, a new data flow has been started with the machine 125 sending data to the machine 130. In the second stage 210, the EFE 105 has detected an elephant flow. The third stage 215 shows that, in response to the detection, the EFE 105 reports the elephant flow to the network controller 225. However, the fourth stage 220 shows that the network controller 225 responding to the report by configuring one or more of the NEFEs (115 and 120).

Figure 3:
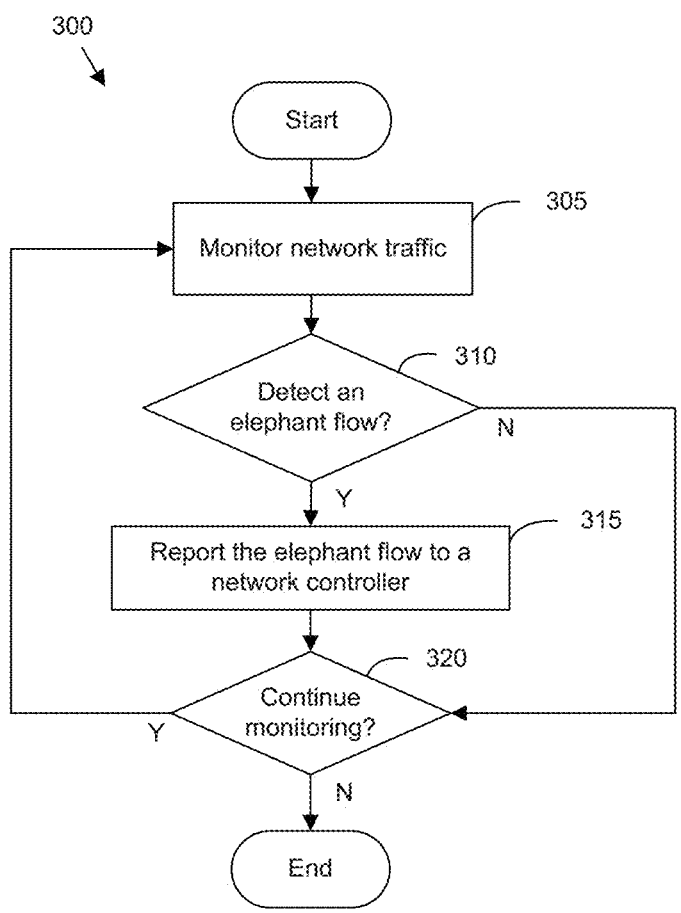
FIG. 3 conceptually illustrates a process 300 that some embodiments implement to report an elephant flow to a network controller FIG. 4 conceptually shows an example of how two forwarding elements monitors tunneled traffic between several network hosts to detect elephant flows and report them to a network controller.

Having described an example of reporting an elephant flow, an example process 3 will now be described. FIG. 3 conceptually illustrates a process 300 that some embodiments implement to report an elephant flow to a network controller. In some embodiments, the process 300 is performed by a forwarding element (e.g., a switch, a router). As shown, the process 300 begins when it monitors (at 305) network traffic to detect an elephant flow. In some embodiments, the process 300 examines statistics relating different flow entries. Alternatively, or conjunctively, the process 300 might detect an elephant flow by examining the size of a packet.

At 310, the process 300 determines whether an elephant flow has been detected. If an elephant flow has not been detected, the process 300 proceeds to 320, which is described below. If an elephant flow has been detected, the process 300 reports (at 315) the elephant flow to a network controller. The process 300 then proceeds to 320.

The process 300 determines (at 320) whether to continue monitoring network traffic. Here, the forwarding element may be set to disable elephant flow detection, or the forwarding element may be reset or turned off. If the determination is made to continue monitoring, the process 300 returns to 305, which is described above. Otherwise, the process 300 ends. Some embodiments perform variations on the process 300. The specific operations of the process 300 may not be performed in the exact order shown and described. The specific operations may not be performed in one continuous series of operations, and different specific operations may be performed in different embodiments.

Several more examples of detection and handling elephant flows will be described in detail below. Section I describes examples of how some embodiments reports elephant flows to a network controller. Specifically, Section I.A describes examples of several forwarding elements that monitors tunneled traffic between two network hosts. Section I.B describes examples of how some embodiments report elephant flows to a network controller. Section I.C then describes an example of a data structure to store and report data relating to an elephant flow. Section II then describes several different examples of how a forwarding element can be configured by a network controller to handle an elephant flow. Section III then describes an example electronic system with which some embodiments of the invention are implemented.

I. Example Implementation

The forwarding element of some embodiments monitors tunneled traffic to detect elephant flows. In some embodiments, the forwarding element is an edge forwarding element that operate in conjunction with another forwarding element to monitor and report any elephant flows, detected at either ends of the tunnel, to the network controller. As an example, in detecting elephant flows, a first forwarding element at one end of the tunnel may monitor outbound packets from a first network host to a second network host and a second forwarding element at the other end of the tunnel may monitor outbound packets from the second network host to the first network host. When an elephant flow is detected at one end of the tunnel, the corresponding forwarding element then reports the flow to the network controller.

A. Monitoring Tunneled Traffic

Figure 4:
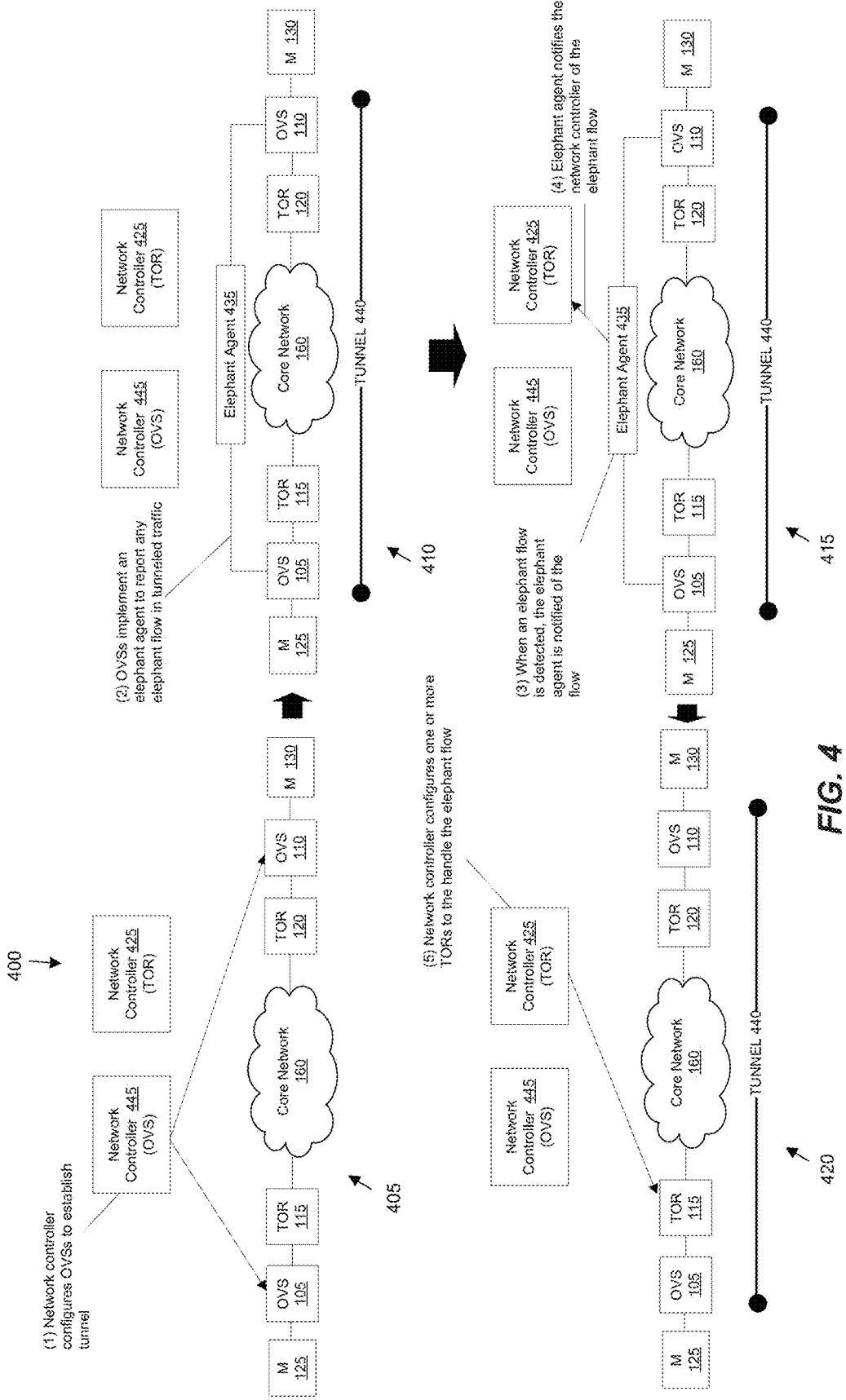

In some embodiments, the forwarding elements communicate with a first set of network controllers to establish a tunnel, and reports elephant flows to a second set of network controllers. FIG. 4 conceptually shows an example of how the EFEs 105 and 110 establish a tunnel through one network controller 445, and report elephant flows to another network controller 425. Four stages 405-420 of the network 400 are shown in the figure.

FIG. 4 shows some of the same forwarding elements 105, 110, 115, and 120 as shown in FIGS. 1 and 2. However, in FIG. 4, the EFEs 105 and 110 are software forwarding elements (e.g., Open Virtual Switches (OVSs)), and the NEFE 115 and 120 are top-of-rack (TOR) switches. The EFEs 105 and 110 are also managed EFEs (MEFEs) because they are managed by the network controller 445. The NEFE 115 and 120 are also MNEFEs because they are managed by the network controller 425. The network controller 445 and the EFEs 105 and 110 may be provided by one vendor (e.g., a company), while the network controller and the NEFEs 115 and 120 may be provided by another vendor. In such a case, the EFE 105 and 110 reports to another vendor's network controller to handle the detected elephant flows.

The first stage 405 of FIG. 4 shows the network controller configuring the EFEs 105 and 110 to establish a tunnel between machines 125 and 130. Tunneling is encapsulating a data packet that includes a header of a first communication protocol with a header of a second communication protocol in order to transmit the data packet over a delivery network that implements the second communication protocol. A tunnel is deemed established when two network nodes of the delivery network are set up to deliver packets from a first of the two network nodes to a second of the two network nodes using the encapsulating protocol. The network nodes of the delivery network may include switches, routers, workstations, servers, virtual machines (VMs), or any devices that can transmit and/or receive data packets.

In the first stage 405, the network controller 445 sends data to establish a tunnel between the machines 125 and 130. The second stage 410 conceptually shows the 440 the established tunnel. In some embodiments, the tunnel is established by providing various pieces of information to each of the EFEs 105 and 110. Examples of such information include IP addresses of the machines 125 and 130, the IP addresses of the hypervisors on which the software forwarding elements (e.g., OVSs) executes, the tunneling protocol to use, etc.

The second stage 410 shows the two EFEs 105 and 110 implementing an elephant agent 435 to report any elephant flow in tunneled traffic between the machines 125 and 130. In some embodiments, each EFEs (105 or 110) includes an elephant agent that monitors traffic on one end to detect and report elephant flows. For instance, the EFE 105 may be associated with one elephant agent module that monitor traffic destined for the machine 130 from the machine 125, while the EFE 110 may be associated with another elephant agent module that monitor traffic destined for the machine 125 from the machine 130.

The third stage 415 shows an elephant flow being reported to the network controller 425. In particular, when an elephant flow is detected, the elephant agent is notified of the flow. In some embodiments, the elephant agent then asynchronously notifies a network controller of the flow. In the example of FIG. 4, the elephant agent 435 is used to report to the elephant flow to the network controller 425 (e.g., from a different vendor). However, the elephant agent can report to the network controller 445, in some embodiments.

The fourth stage 420 shows the network controller 425 responding to the elephant flow report. Specifically, the network controller 425 configures the NEFE 115 to handle the elephant flow. The network controller 425 may configure the NEFE 115 to place elephant flows into different queues from mice, choose different equal-cost multi-path routing (ECMP) paths for the elephant flows, and/or route elephant flows along a separate physical network.

Figure 5:
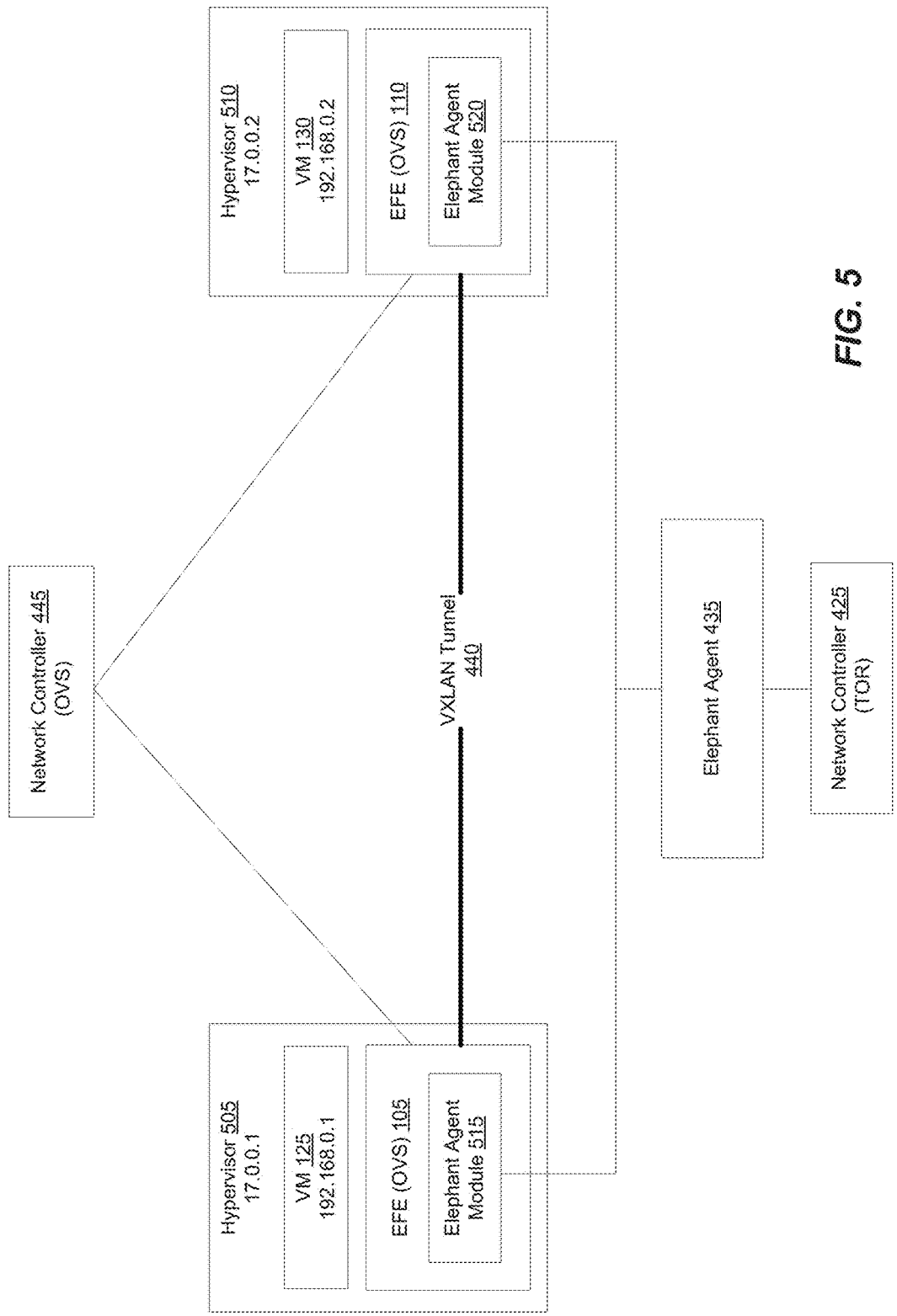
FIG. 5 illustrates an example of how the two edge forwarding elements implement an elephant agent to monitor tunneled traffic.

In the example described above, the elephant agent 435 reports a detected elephant flow to the network controller 445. FIG. 5 illustrates an example of how the EFEs 105 and 110 implement such the elephant agent 435 to monitor tunneled traffic. In this example, the machine 125 is a virtual machine (VM) that operates on a hypervisor 505. The hypervisor 505 also includes the EFE 105. Similarly, the machine 130 is a virtual machine (VM) that operates on a hypervisor 510. The hypervisor 510 includes the EFE 110.

In the example of FIG. 5, the network controller 445 configures the EFEs to establish the tunnel 440 between the VMs 125 and 130. The tunnel is configured using the IP addresses associated with the VMs 125 and 130 and hypervisors 505 and 510. Specifically, the VMs are using addresses from the 192.168.0.x private address space. The hypervisors are using addresses in the 17.0.0.x address space. The two VMs may also be assigned a same tunnel key or logical forwarding element identifier. The logical forwarding element identifier is used to implement a logical forwarding element from at least the EFEs 105 and 110 (e.g., the software forwarding elements).

The tunnel 440 is shown as a Virtual Extensible LAN (VXLAN) tunnel because the two EFEs 105 and 110 are using the VXLAN protocol. However, the tunnel can be established using a different protocol, such as Stateless Transport Tunneling Protocol (STT), Generic Routing Encapsulation (GRE), etc. In some embodiments, the tunnel is a shared tunnel. There can be multiple connections connection. For instance, even though the tunnel may have been configured as a single tunnel, the tunnel may be shared by multiple machines (e.g., associated with different tenants).

As mentioned above, when an elephant is detected, the forwarding element identifies various pieces of information that can be used to identify packets belonging to the elephant flow. The forwarding element may identify tunnel information, such as the tunnel ID, the IP address of the source tunnel endpoint (e.g., the hypervisor), and the IP address of the destination tunnel endpoint. The forwarding element of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

In some embodiments, the forwarding element identifies header values relating to the outer packet. The main reason for this is that these header values of the outer packet are what a subsequent forwarding element may look at. That is, the subsequent forwarding element may not even look at or perform a look up on the inner packet headers. When forwarding traffic, the subsequent forwarding element may identify the five tuples (e.g., that make up a TCP/IP connection) of the outer packet, such as source IP address, destination IP address, source port number, destination port number, and the protocol in use. As such, the forwarding element of some embodiments report such set of tuples to the network controller.

In the example of FIG. 5, the EFEs 105 and 110 has established the tunnel 440 between the VMs 125 and 130. Each of the EFE 105 or 110 can monitor the tunneled traffic to detect elephant flow. As mentioned above, the EFE is in a unique position to identify elephant flows. The EFE has the advance over a NEFE in that it is the last forwarding element or the tunnel endpoint before one or more end machines (e.g., VMs, computing device). Thus, the EFE can more easily monitor tunneled traffic coming from and going to an end machine than a NEFE. The EFE of some embodiments also has the advantage over the NEFE because the NEFE may not be able to detect an elephant flow based on the size of a packet. For instance, depending on how the network is configured, a NEFE may never receive large TCP packets but only receive smaller MTU-sized packets.

As shown in FIG. 5, the EFEs 105 and 110 implement the elephant agent 435. To implement the elephant agent 435, each of the EFEs 105 or 110 includes an elephant agent module 515 or 520 that reports a detected elephant flow to the network controller 110. The elephant agent module 515 reports any detected elephant flows at one end of the tunnel 440, while the elephant agent module 520 reports any detected elephant flow at the other end of the tunnel.

B. Example Mechanism for Reporting Elephant Flows

In some embodiments, the network controller is registered with the forwarding element to receive an update report each time the forwarding element detects an elephant. For instance, when an elephant flow is detected, the forwarding element may identify one or more pieces of information relating to the elephant flow, and store information in a database through a database server. The network controller may be also registered with the database server to receive an update if there are any changes to the data relating to elephant flows, which are stored in the database. Hence, if there is an update, the forwarding element's database server may send a notification (e.g., an asynchronous notification) to the network controller regarding the change to the elephant flow data stored in the database. The notification may include one or more pieces of information mentioned above.

Figure 6:
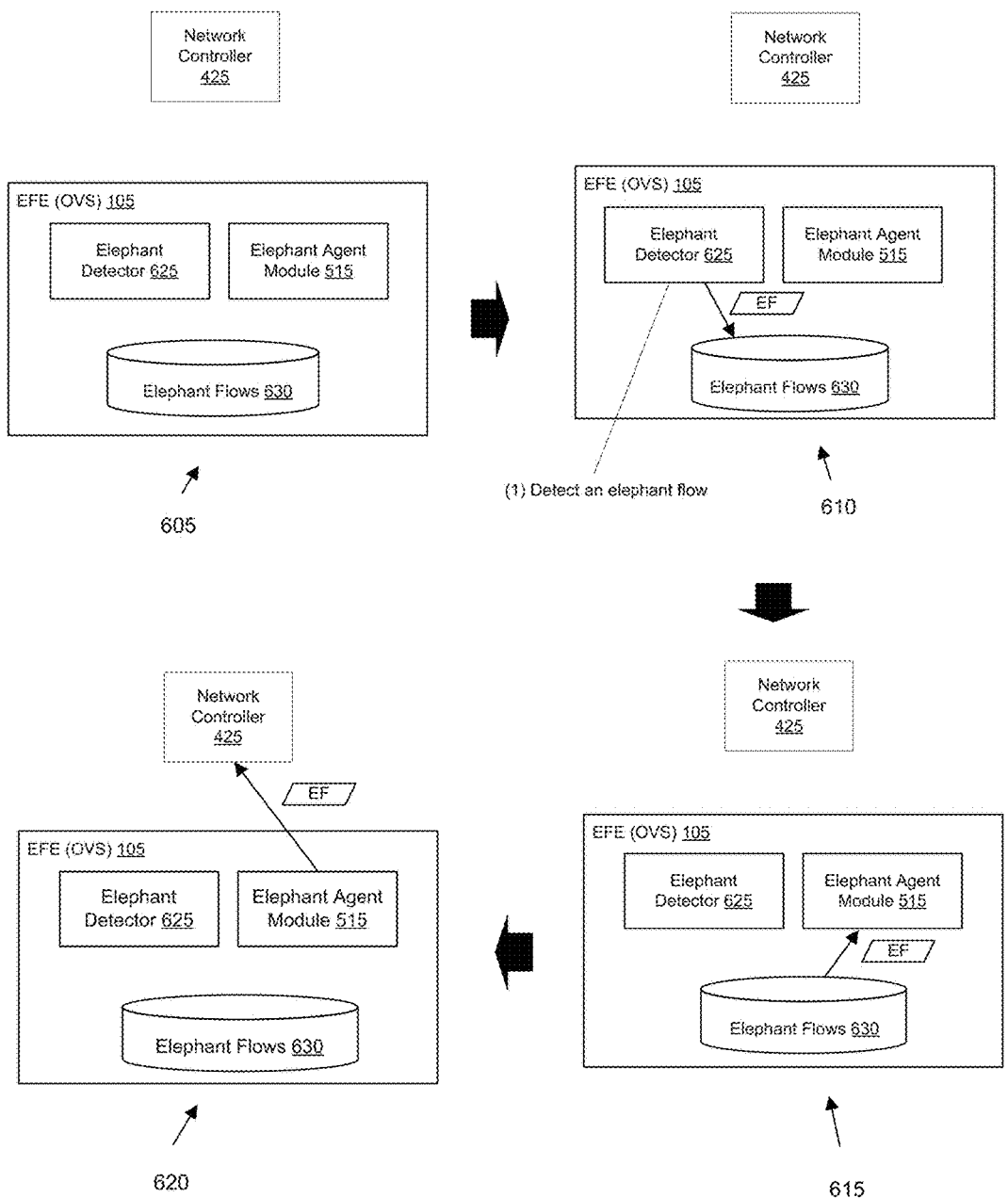
FIG. 6 illustrates example operations performed by a forwarding element to report an elephant flow.

In several of the example described above, a forwarding element reports any detected elephant flow to a network controller. FIG. 6 illustrates example operations performed by a forwarding element to report such an elephant flow.

Four operational stages 605-620 of the EFE 105 are shown in this figure. In this example, the EFE 105 includes an elephant detector 635 that detects elephant flows. The first stage 605 shows the elephant detector 625 operating on the EFE to detect an elephant flow. In the second stage 610, the elephant detector 625 has detected an elephant flow and stores data relating to the flow in storage 630. In some embodiments, when an elephant is detected, the system identifies various pieces of information that can be used to identify packets belonging to the elephant flow. The system may identify tunnel information, such as the tunnel ID, the IP address of the source tunnel endpoint (e.g., the hypervisor), and the IP address of the destination tunnel endpoint. The system of some embodiments identifies the elephant flow packet's ingress port, source transport layer (e.g., UDP or TCP) port, destination transport layer port, Ethernet type, source Ethernet address, destination Ethernet address, source IP address, and/or destination IP address.

The third stage 615 shows that the elephant agent module 515 is notified of the changes to the data relating to elephant flows. The elephant agent module then sends the report regarding the elephant flow to the network controller 425. In some embodiments, the storage 630 is maintained by a database server (not show) that supports bi-directional asynchronous notifications. For example, when there is an update to a database table with the elephant flow, the database server sends a notification regarding an update to the elephant agent module. The notification may include a copy of the table or a subset of the table (e.g., a record) that was updated.

C. Example Data Structure

Figure 7:
FIG. 7 conceptually illustrates an example data structure to store and report data relating to each detected elephant flow.

As mentioned above, when an elephant flow is detected, the forwarding element of some embodiments identifies one or more pieces of information that can be used to identify packets belonging to an elephant flow. FIG. 7 conceptually illustrates an example data structure 700 to store and/or report data relating to each detected elephant flow. As shown, the data structure includes an elephant flow identifier (ID) to (e.g., uniquely) identify the detected elephant flow and a tunnel ID to identify a tunnel with the elephant flow traffic, the IP address of the source tunnel endpoint (e.g., the hypervisor), the IP address of the destination tunnel endpoint, the packet's ingress port, source Ethernet address, destination Ethernet address, source IP address, destination IP address, Ethernet type, source transport layer (e.g., UDP or TCP) port, destination transport layer port, etc.

One of ordinary skill in the art would understand that the data structure 700 is an example data structure, and the different embodiments may define one or more different data structures to identify an elephant flow and report the elephant flow to an agent that is interested in the report. For instance, the forwarding element of some embodiments may identify additional data for a detected elephant flow, or even fewer data.

II. Example Elephant Flow Handlers

When a report regarding an elephant flow is received, the network controller of some embodiments configures one or more forwarding elements. Different embodiments configure the network controller differently. As an example, the network controller perform a Quality of Service (QOS) configuration on the forwarding element to place packets belonging to the elephant flow in a particular queue that is separate from one or more other queues with other packets, break the elephant flow into mice flows, etc. Alternatively, the network controller may configure the forwarding element to break the elephant flow into mice flows by sending packets associated with the elephant flow along different paths (e.g., equal-cost multipath routing (ECMP) legs). As another example, the forwarding element may be configured to send elephant flow traffic along a separate physical network, such as an optical network that is more suitable for slow changing, bandwidth-intensive traffic. Several such examples will now be described below by reference to FIGS. 8-11.

A. Example QOS Operation

Figure 8:
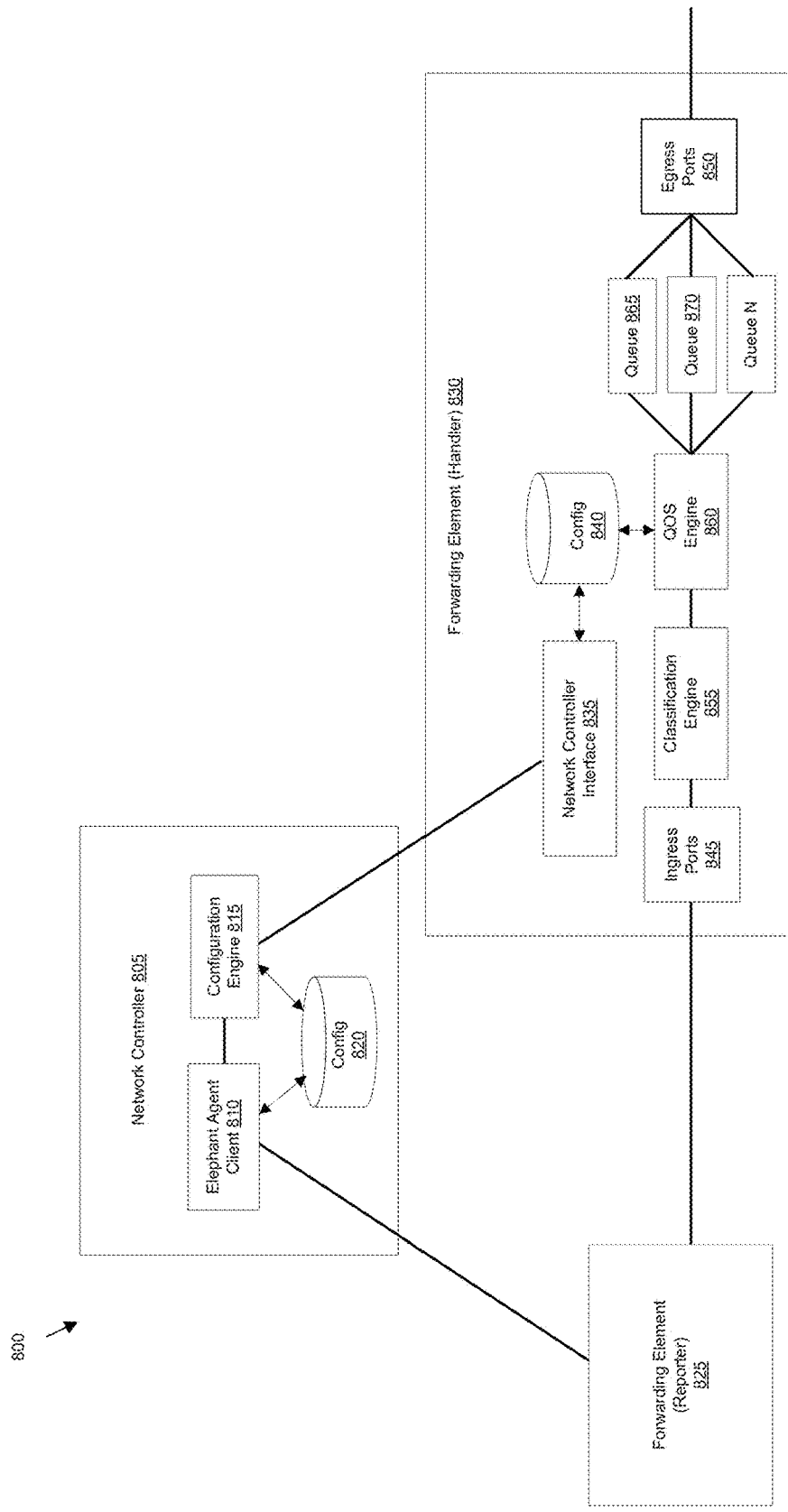
FIG. 8 provides an illustrative example of a forwarding element that performing quality of service operations on packets in a detected elephant data flow.

FIG. 8 provides an illustrative example of a forwarding element 830 that performing QOS operations on packets in a detected elephant data flow. As shown, the figure shows a network that includes a forwarding element 825 that reports an elephant flow, and a network controller 805 that receives the report and configures the forwarding element 830. To simply the description, the forwarding element 825 is also referred to below as the reporter, and the forwarding element 830 is also referred to below as the handler.

The forwarding element 825 reports each detected elephant flow to the network controller. In response to a report regarding a detected elephant flow, the network controller 805 configures one or more forwarding elements. As mentioned above, the network controller can configure the same forwarding element, and/or can configure one or more other forwarding elements that receive packets in the same elephant data flow.

In the example of FIG. 8, the network controller 805 includes an elephant agent client 810 and a configuration engine 815. In some embodiments, the elephant agent client 810 is responsible for receiving a report regarding an elephant flow from the forwarding element 825 and storing the report in the storage 820 (e.g., a configuration database). The elephant agent client 810 may also inform the configuration engine 815 that a new report is stored in the storage 820. In some embodiments, the elephant agent client 810 communicates with an elephant agent module that operates on the reporter 825. An example of such a module is described above by reference to FIG. 6.

Different from the client 810, the configuration engine 815 receives information regarding the elephant flow stored in the storage and configures the forwarding element 830 (the handler). The configuration engine may be notified of a new report stored in the storage from the elephant agent client 810 or some other component, in some embodiments. For instance, the storage 820 may be managed by another component (e.g., database manager or server) that informs the configuration engine 815 of the changes to the data in the storage 820. Irrespective of method of notification, the configuration engine 815 configures the handler 830. In the example of FIG. 8, the configuration engine sends instructions to the handler. The forwarding element 830 then translates those instructions into a QOS configuration to perform on packets belonging to the detected elephant flow.

The handler 830 is configured by the network controller to process packets belonging to the elephant flow different from other packets (e.g., in other flows, such a mouse flow or a non-detected elephant flow). As shown, the handler 830 includes (1) several ingress ports 845 to receive packets, (2) a classification engine 855 to find a matching rule to process each packet, (3) a QOS engine 860 to perform a QOS operation on each packet, (4) a number of egress queues (e.g., 865, 870, etc.), and (5) several egress ports 850 to output the packets. The handler 830 also includes a network controller interface 835, which the network controller 805 (e.g., the configuration engine 860) to interface or communicate with the network controller 805 and a storage 840 to store configuration data (e.g., QOS configuration). In some embodiments, the configuration data includes one or more of elephant flow identifying information described above by reference to FIG. 7.

Having described several components, example operations of operations of the network will now be described by reference to FIG. 8. As shown, the reporter 825 reports a detected elephant flow to the network controller 805. In some embodiments, the elephant agent client 810 receives the report and stores the report in the storage 820. The configuration engine 815 of some embodiments retrieves the report from the storage 820 and configures handler 830. In configuration, the configuration engine 815 may communicate with the handler 830 through the interface 835. In some endowments, the configuration data is stored in the storage 840 of the handler. Here, the storage stores QOS configuration data.

The forwarding element 825, which reported the elephant flow, also sends packets in the same elephant flow to the handler 830. Each packet in the elephant flow is received at a particular ingress port 845. The classification engine 855 receives the packet in the elephant flow and performs packet classification to identify a matching rule to process the packet. The packet is then received at the QOS engine 860. The QOS engine 860 then reads the configuration data to identify the packet, and perform a QOS operation on the packet. As mentioned above, the forwarding element to place packets belonging to the elephant flow in a particular queue that is separate from one or more other queues with other packets. The particular queue may be a lower priority queue that one or more of the other queues, in some embodiments. Finally, the packet is retrieved from the particular queue and forwarded to a next hop through one of the egress ports 850.

Figure 9:
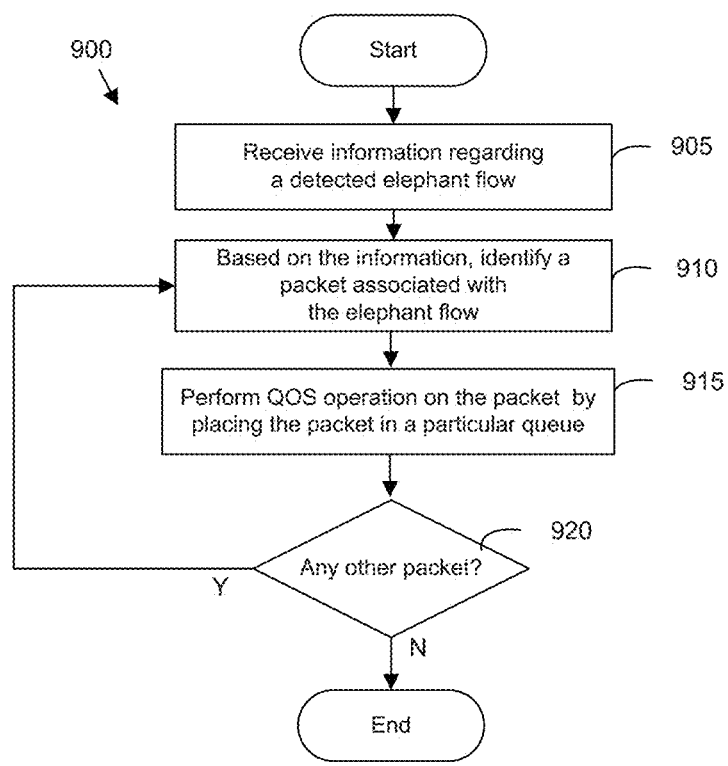
FIG. 9 conceptually illustrates a process that some embodiments implement to perform quality of service operations on packets associated a detected elephant flow.

Having described an example of performing QOS operation, an example process will now be described. FIG. 9 conceptually illustrates a process 900 that some embodiments implement to perform QOS operations on packets associated a detected elephant flow. In some embodiments, the process 900 is performed by a forwarding element, such as the handler 830. As shown, the process 900 receives (at 905) information regarding a detected elephant flow. Based on the information, the process 900 then identifies (at 910) a packet associated with the detected elephant flow. In some embodiments, the process identifies a packet associated with the elephant flow using one or more of pieces of information shown in FIG. 7.

At 915, the process 900 performs a QOS operation on the packet by placing the packet in a particular queue. The process then determines (at 920) whether there is another packet in the same elephant flow. If there is another packet, the process returns to 910, which is described above. Otherwise, the process 900 ends. Some embodiments perform variations on the process 900. The specific operations of the process 900 may not be performed in the exact order shown and described. The specific operations may not be performed in one continuous series of operations, and different specific operations may be performed in different embodiments.

B. Example of Breaking an Elephant Flow into Mouse Flows

Figure 10:
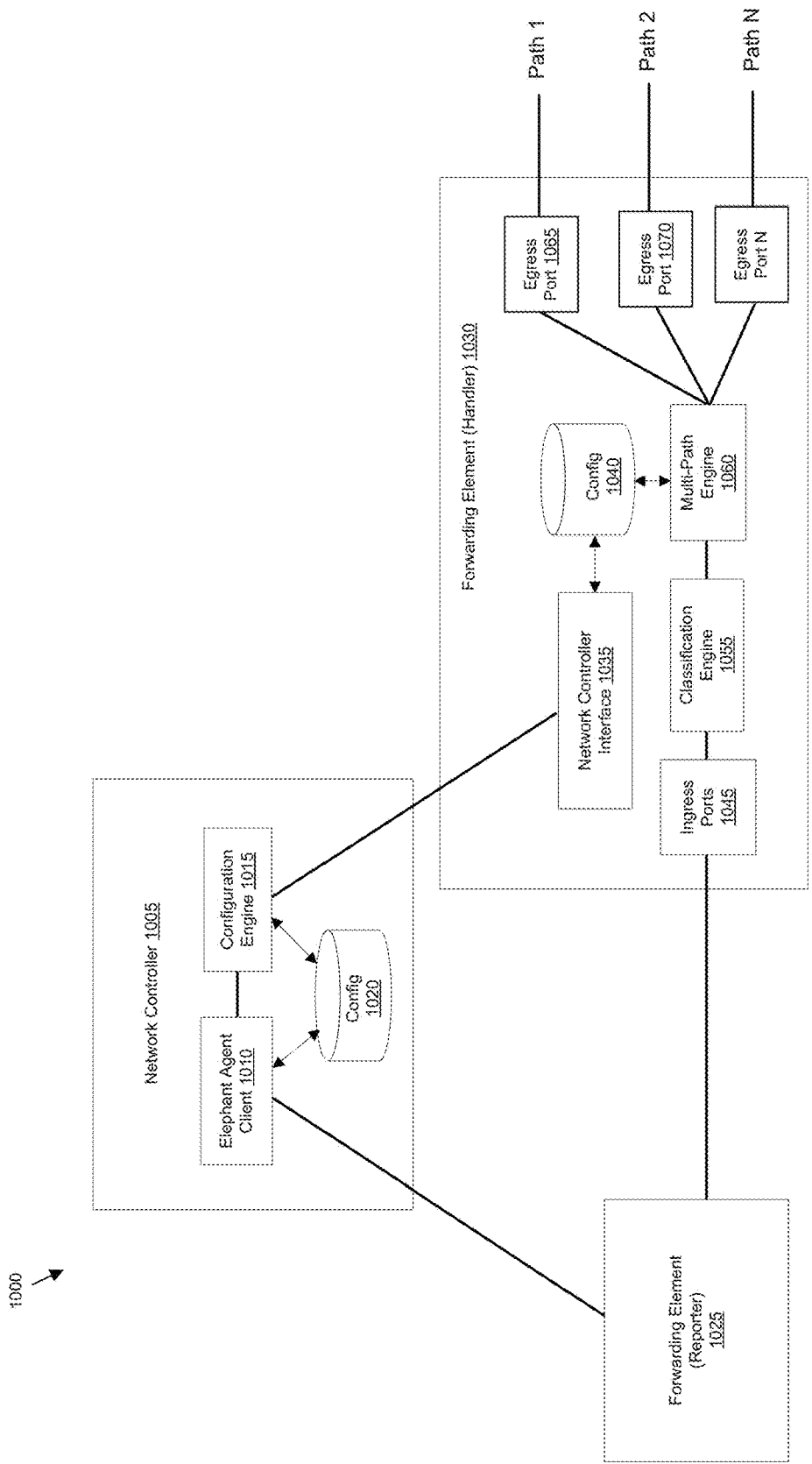
FIG. 10 provides an illustrative example of a forwarding element that performing breaks an elephant flow into a bunch of mouse flows.

FIG. 10 provides an illustrative example of a forwarding element 1030 that performing breaks an elephant flow into a bunch of mouse flows. This figure is similar to FIG. 8, except the handler 1030 includes a multi-path engine 1060 that reads the configuration data 1040 to send packets associated with the elephant flow along different paths.

In the example of FIG. 10, the reporter 1025 reports a detected elephant flow to the network controller 1005. The network controller 1005 configures the handler 1030 by storing configuration data in the storage 1040. The forwarding element 1025, which reported the elephant flow, also sends packets in the same elephant flow to the handler 1030. Each packet in the elephant flow is received at a particular ingress port 1045. The classification engine 1055 receives the packet in the elephant flow and performs packet classification to identify a matching rule to process the packet. The packet is then received at the multi-path engine 1060. The multi-path engine 1060 then reads the configuration data to identify the packet, and perform send a packet along a particular path through one of the egress ports, such as ports 1065, 1070, etc. If the multi-path engine receives another packet in the same data flow, it may send the other packet along a different path.

Figure 11:
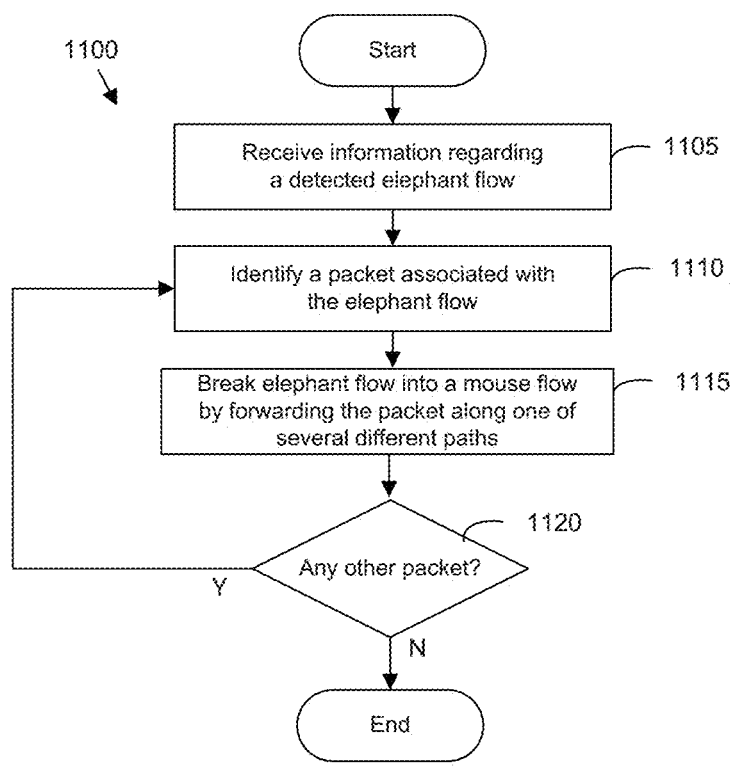
FIG. 11 conceptually illustrates a process that some embodiments implement to break an elephant into mice.

Having described an example of breaking an elephant flow into several mouse flows, an example process will now be described. FIG. 11 conceptually illustrates a process 1100 that some embodiments implement to break an elephant into mice. In some embodiments, the process 1100 is performed by a forwarding element, such as the handler 1030. As shown, the process 1100 receives (at 1105) information regarding a detected elephant flow. Based on the information, the process 1100 then identifies (at 1110) a packet associated with the detected elephant flow. In some embodiments, the process identifies a packet associated with the elephant flow using one or more of pieces of information shown in FIG. 7.

At 1115, the process 1100 breaks an elephant flow into a mouse flow by forwarding the packet along one of several different paths. The process then determines (at 1120) whether there is another packet in the same elephant flow. If there is, the process returns to 1110, which is described above. Otherwise, the process 1100 ends. Some embodiments perform variations on the process 1100. The specific operations of the process 1100 may not be performed in the exact order shown and described. The specific operations may not be performed in one continuous series of operations, and different specific operations may be performed in different embodiments.

III. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
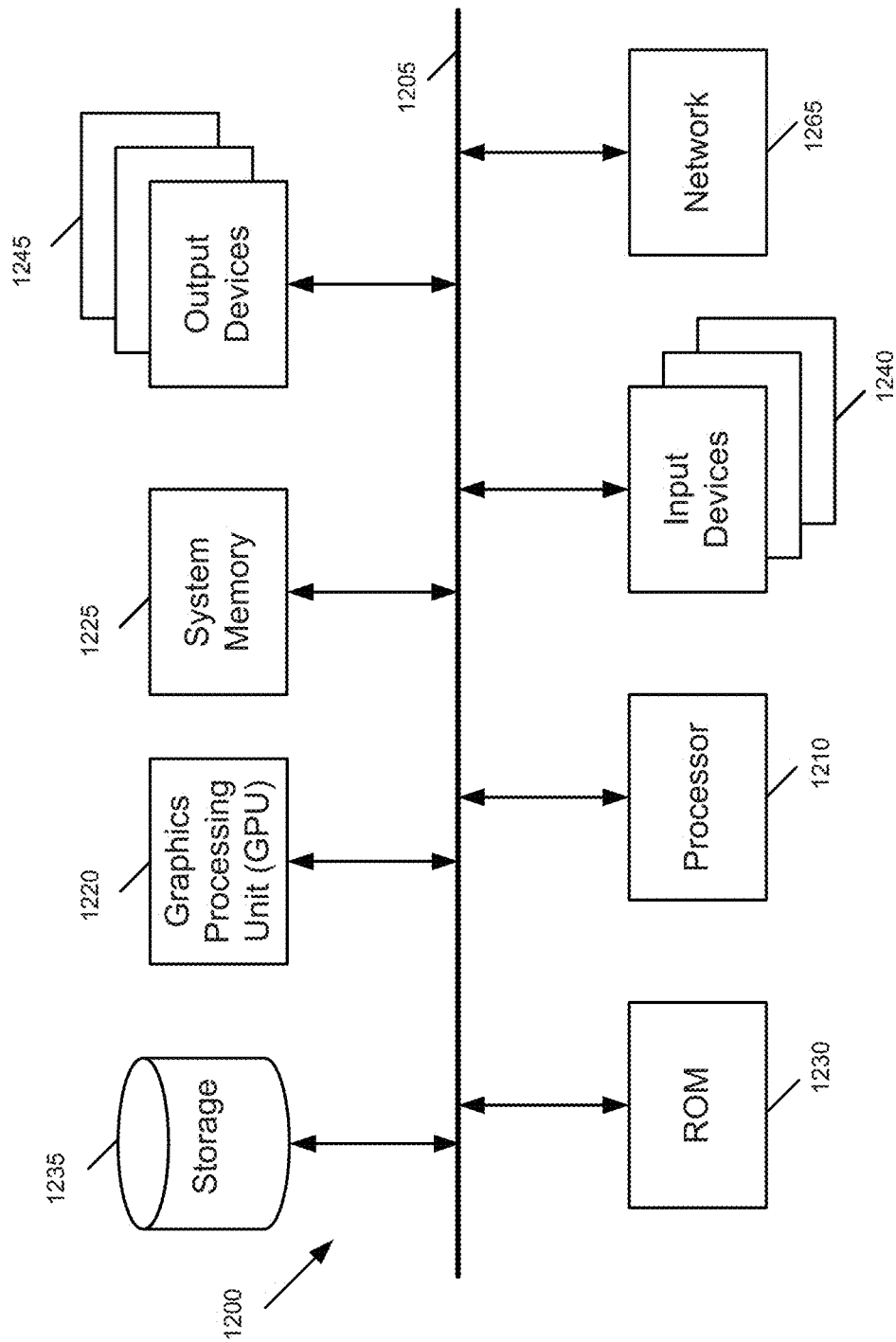
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, FIGS. 3, 9, and 11 conceptually illustrates processes. As mentioned above, the specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program, that when executed by at least one processing unit of a host computer implements an edge forwarding element on the host computer, the program comprising sets of instructions for:
   monitoring data flows sent from a plurality of machines that execute on the host computer along with the edge forwarding element;
   generating a set of statistics related to each monitored data flow;
   determining that one of the data flows is an elephant flow based on the generated statistics;
   reporting the elephant flow to a set of network controllers;
   receiving, from the set of network controllers, configuration data that configures the edge forwarding element to break the elephant flow into a plurality of mice flows that are sent along different paths to a destination of the elephant flow; and
   using equal cost multipath (ECMP) routing to break the elephant flow into the plurality of mice flows and sending each mice flow along one of the plurality of paths to the elephant flow's destination.

2. The non-transitory machine readable medium of claim 1, wherein the edge forwarding element is part of a network that comprises edge and non-edge forwarding elements, and the non-edge forwarding elements comprising hardware top of the rack switches.

3. The non-transitory machine readable medium of claim 2, wherein the program further comprises a set of instructions for establishing, based on a tunnel configuration received from the set of network controllers, a tunnel between the edge forwarding element of the host computer and another edge forwarding element of another host computer.

4. The non-transitory machine readable medium of claim 1, wherein the configuration data from the set of network controllers configures the edge forwarding element to use ECMP routing to break the elephant flow into the plurality of mice flows and to send each mice flow along one of the plurality of paths to the elephant flow's destination.

5. The non-transitory machine readable medium of claim 4, wherein the set of instructions for sending each mice flow along one of the plurality of paths comprises sending a first mice flow through a first egress port and sending a second mice flow through a second egress port.

6. A method for an edge forwarding element that operates on a host computer, the edge forwarding element part of a network that comprises edge and non-edge forwarding elements, the method comprising:
 at the edge forwarding element, monitoring data flows sent from a plurality of machines that execute on the host computer along with the edge forwarding element;
 generating a set of statistics related to each monitored data flow;
 determining, at the edge forwarding element, that one of the data flows is an elephant flow based on the generated statistics;
 sending a report identifying the elephant flow to a network controller that, based on the report, configures one particular non-edge forwarding element to break the elephant flow into a plurality of mice flows; and
 forwarding the packets of the elephant flow through the network, wherein when the particular non-edge forwarding element receives the elephant flow packets, the particular non-edge forwarding element breaks the elephant flow into the plurality of mice flows and sends each mice flow along a different one of a plurality of paths to a destination of the elephant flow.

7. The method of claim 6, wherein, based on the report identifying the elephant flow, the network controller further configures a set of edge forwarding elements.

8. The method of claim 7, wherein the non-edge forwarding elements operate as software forwarding elements on a computing device.

9. The method of claim 6, wherein the non-edge forwarding elements of the network comprise hardware top of the rack switches.

10. The method of claim 6, wherein the network controller configures the particular non-edge forwarding element to use equal cost multipath (ECMP) routing to break the elephant flow into a plurality of mice flows.

11. The method of claim 10, wherein the particular non-edge forwarding element sends a first mice flow through a first egress port and sending a second mice flow through a second egress port.

12. A non-transitory machine readable medium storing a program, that when executed by at least one processing unit of a host computer implements an edge forwarding element on the host computer, the edge forwarding element part of a network that comprises edge and non-edge forwarding elements, the program comprising sets of instructions for:
 monitoring data flows sent from a plurality of machines that execute on the host computer along with the edge forwarding element;
 generating a set of statistics related to each monitored data flow;
 determining that one of the data flows is an elephant flow based on the generated statistics;
 sending a report identifying the elephant flow to a network controller that, based on the report, configures one particular non-edge forwarding element to break the elephant flow into a plurality of mice flows; and
 forwarding the packets of the elephant flow through the network, wherein when the particular non-edge forwarding element receives the elephant flow packets, the particular non-edge forwarding element breaks the elephant flow into the plurality of mice flows and sends each mice flow along a different one of a plurality of paths to a destination of the elephant flow.

13. The non-transitory machine readable medium of claim 12, wherein the network controller configures the particular non-edge forwarding element to perform different quality of service (QoS) operations for the elephant flow than other data flows.

14. The non-transitory machine readable medium of claim 12, wherein the network controller provides configuration data to the particular non-edge forwarding element that directs the particular non-edge forwarding element to perform equal cost multipath (ECMP) routing to break the elephant flow into the plurality of mice flows sent along one of the plurality of paths to the elephant flow's destination.

15. A non-transitory machine readable medium storing a program, that when executed by at least one processing unit of a host computer implements an edge forwarding element on the host computer, the edge forwarding element part of a network that comprises edge and non-edge forwarding elements, the program comprising sets of instructions for:
 monitoring data flows sent from a plurality of machines that execute on the host computer along with the edge forwarding element;
 generating a set of statistics related to each monitored data flow;
 determining that one of the data flows is an elephant flow based on the generated statistics;
 sending a report comprising encapsulation header information to the network controller identifying the elephant flow, wherein the controller, based on the report, configures one particular non-edge forwarding element to break the elephant flow into the plurality of mice flows based on the encapsulation header information; and
 encapsulating the monitored data flows and forwarding the packets of the elephant flow through the network, wherein when the particular non-edge forwarding element receives the elephant flow packets, the particular non-edge forwarding element breaks the elephant flow into the plurality of mice flows and sends each mice flow along a different one of a plurality of paths to a destination of the elephant flow.

16. The non-transitory machine readable medium of claim 15, wherein the network controller provides configuration data to the particular non-edge forwarding element that directs the particular non-edge forwarding element to perform equal cost multipath (ECMP ) routing to break the elephant flow into the plurality of mice flows sent along one of the plurality of paths to the elephant flow's destination.

* * * * *